(12) United States Patent
Daly et al.

(10) Patent No.: US 8,904,745 B2
(45) Date of Patent: Dec. 9, 2014

(54) LINK FOR LINEAR CABLE CARRY CHAIN

(75) Inventors: Paul Anthony Daly, Hornsby (AU); Tony J Gardner, Tare (AU)

(73) Assignee: Cobraco IP Pty Limited, Tare, New South Wales (AU)

( * ) Notice: Subject to any disclaimer, the term of this patent is extended or adjusted under 35 U.S.C. 154(b) by 0 days.

(21) Appl. No.: 14/007,059

(22) PCT Filed: Mar. 25, 2011

(86) PCT No.: PCT/AU2011/000340
§ 371 (c)(1),
(2), (4) Date: Dec. 27, 2013

(87) PCT Pub. No.: WO2012/129588
PCT Pub. Date: Oct. 4, 2012

(65) Prior Publication Data
US 2014/0102070 A1    Apr. 17, 2014

(51) Int. Cl.
*F16G 13/16* (2006.01)
*B21L 3/02* (2006.01)
*F16G 13/18* (2006.01)

(52) U.S. Cl.
CPC ............... *F16G 13/18* (2013.01); *F16G 13/16* (2013.01); *Y10S 59/90* (2013.01)
USPC ................ 59/78.1; 59/900; 248/49; 248/51

(58) Field of Classification Search
USPC ............................. 59/78.1, 900; 248/49, 51
See application file for complete search history.

(56) References Cited

U.S. PATENT DOCUMENTS

| 3,779,003 | A | * | 12/1973 | Boissevain et al. | 59/78.1 |
| 6,029,437 | A | * | 2/2000 | Hart | 59/78 |
| 6,067,788 | A | * | 5/2000 | Weber | 59/78.1 |
| 6,925,795 | B2 | * | 8/2005 | Komiya | 59/78.1 |
| 7,441,397 | B2 | * | 10/2008 | Hart | 59/78.1 |
| 7,451,589 | B2 | | 11/2008 | Howard | |
| 2012/0096828 | A1 | | 4/2012 | Jaeker et al. | |

FOREIGN PATENT DOCUMENTS

| AU | 2010224453 A1 | 4/2011 |
| DE | 202009005650 U1 | 7/2009 |
| EP | 0 620 382 A1 | 10/1994 |
| WO | 01/29448 A1 | 4/2001 |
| WO | 2007/016738 A1 | 2/2007 |

OTHER PUBLICATIONS

International Search Report mailed Jun. 10, 2011; PCT/AU2011/000340.

* cited by examiner

*Primary Examiner* — David B Jones
(74) *Attorney, Agent, or Firm* — Ladas & Parry LLP (57) ABSTRACT

A link for a linear carrier chain is disclosed, said link including side and end walls connected together to form a duct for a hose, cable or the like, said walls being connected by means of flanges adjacent edges of some of said walls, said flanges being slidably engaged in slots in others of said walls and wherein said flanges are disposed at outwardly directed oblique angles to reduce stress concentrations at the base thereof.

28 Claims, 9 Drawing Sheets

LINK FOR LINEAR CABLE CARRY CHAIN

TECHNICAL FIELD

This invention relates to, but is not limited to industrial cable or hose and or both cable and hose carriers. More particularly, although not exclusively, it discloses an improved linear link cable carrier for use in the mining industry.

BACKGROUND TO THE INVENTION

In the mining industry it is known to encase hose or cable or both within a flexible chain for the purpose of protecting, supporting and routing said cable or hose. The chain is flexible as it is constructed from a plurality of links pivotally connected in serial fashion about transverse axes. Each link may comprise end and side walls connected and arranged to define an enclosed duct through which both the hose or cable passes. At least one of the walls of each link is removable to allow access to the duct and both the cables or hoses therein.

One disadvantage with existing linear link carrying chains such as that disclosed for example in international patent application PCT/AU2006/001129 is that the connections securing the removable side walls to the end walls of the links are subject to failure. These connections comprise sets of flanges on the inside edges of the side walls in which slide and are received in slots formed in the adjacent portions of the end walls. The flanges have enlarged rounded ends which seat within correspondingly shaped slots. The flanges however extend substantially at right angles to the side walls and they are subject to tearing at their bases from the forces imposed by the stressed and deformed side walls when routing around corners and bends. A further disadvantage with the aforementioned prior art chain links is that the flange and slot configuration requires precise machining and is not suitable for manufacture by lower cost moulding techniques.

It is therefore an object of this invention to ameliorate or address one or more of the aforementioned disadvantages.

SUMMARY OF THE INVENTION

In a first aspect the present invention provides a link for a linear carrier chain, said link including side and end walls connected together to form a duct for a hose, cable or the like, said walls being connected by means of flanges adjacent edges of some of said walls, said flanges being slidably engaged in slots in others of said walls and wherein said flanges are disposed at outwardly directed oblique angles to reduce stress concentrations at the base thereof.

The link may include two side walls and two end walls with said flanges being formed on the side walls and the slots being formed in the end walls.

Said flanges may include enlarged ends which slidably seat within correspondingly shaped cavities in the slots.

Said flanges may be orientated to substantially correspond in direction with applied tensile forces on said flange arising during use of said chain for cable or hose routing.

At least one of said slots may be tapered inwardly along a length thereof whereby the flanges are prestressed to at least partially counteract said applied tensile forces.

Said flanges and slots may be dimensioned to provide a clearance gap along inner sides of said flanges to reduce stress concentrations at the bases thereof.

The flanges may be formed with a dovetail shaped profile.

The ends of said flanges may be non-circular in cross-section.

The flanges may have an asymmetrical profile whereby any fatigue cracks occurring at the bases of said flanges are directed into the side plates rather then across the width of said flanges.

The link may further include a number of locking keys which resist the flanges from sliding out of engagement with their respective slots.

Said keys may be rectangular and formed with projections adjacent their outer ends which seat in depressions in the cutouts to prevent inadvertent removal.

The keys may include ridges which correspond with grooves in the walls to ensure that the keys can be inserted into the link in only one orientation.

The locking keys may be accessible for removal from a side of the link.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
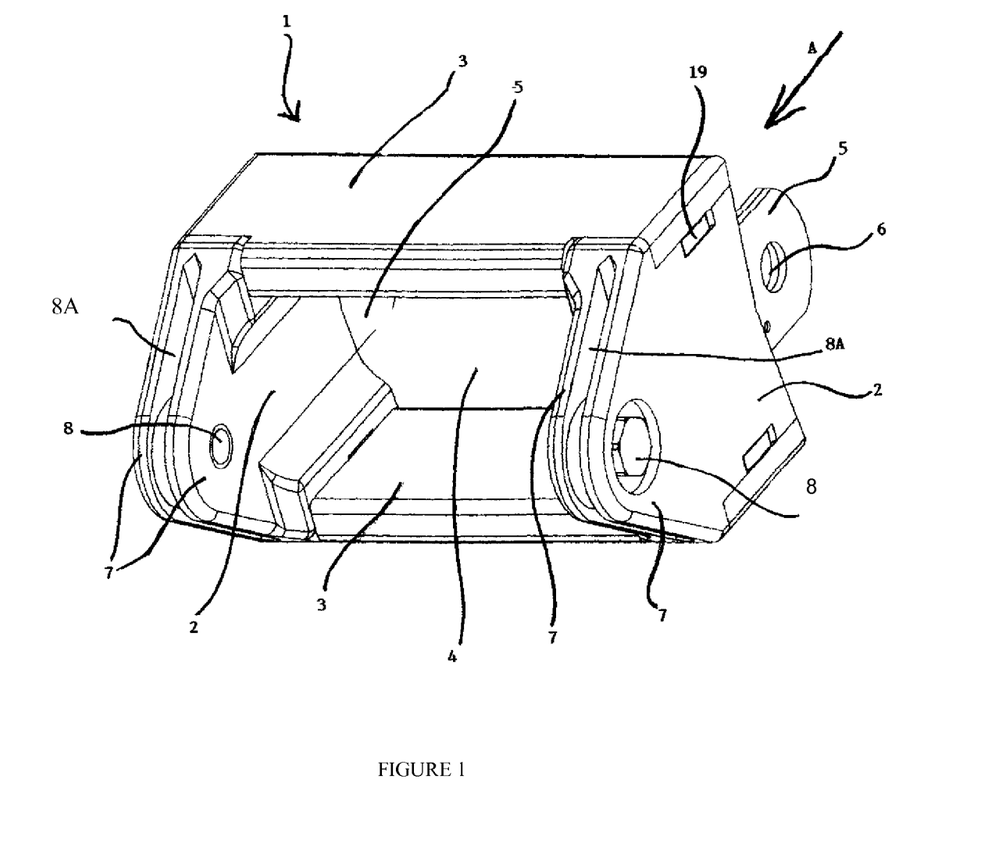
FIG. 1 is a perspective view of a link for a linear carry chain.
Figure 2:
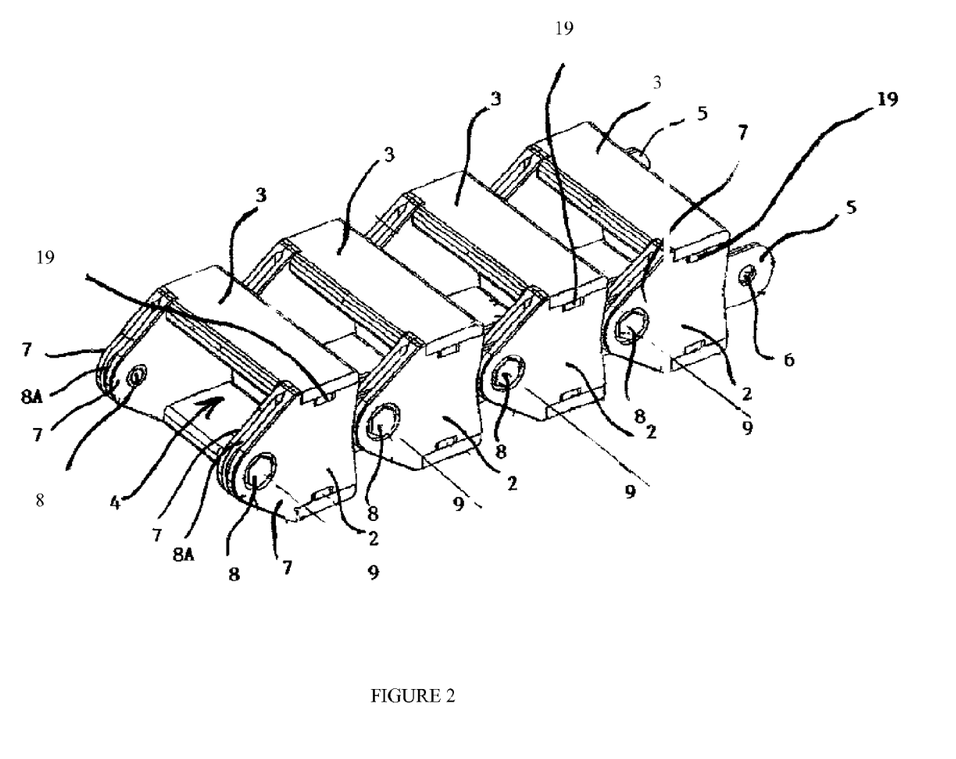
FIG. 2 shows a length of linear carry chain made up of a plurality of links as depicted in FIG. 1.

Referring first to FIGS. 1 and 2 there is a link indicated generally as 1 which comprises a pair of spaced substantially parallel end walls 2 that extend between and are releasibly connected to generally parallel spaced side walls 3. The side and end walls are arranged to define a segment of duct 4 for passage of cable, hose or the like (not shown). The end walls 2 at one end have outwardly extending rounded plates 5 with aligned apertures 6. Although only one aperture 6 is shown in FIG. 1 the opposite end wall is similarly constructed with a plate 5 and aperture. In the opposite direction each end wall is divided into spaced parallel end panels 7 with aligned holes 8 which define a plate receiving channel 8A therebetween. These panels and holes are shaped to interlock with the above described plates and apertures as formed on another identical link. A plurality of links according to this invention can be pivotally attached together in serial fashion as shown in FIG. 2 by means of bolts or pins passing through said aligned apertures and holes along axes 9. In the case of bolts the holes may be threaded. The resulting chain provides an elongated flexible protective duct for the routing of cables, hoses or the like.

As shown in FIGS. 3 to 6, the side walls are removably attached to the end walls at each corner of the link by means of curved flanges 10 which slidably engage in respective slots 11 in the end plates 2. These flanges are preferably but not essentially directed outwardly at about 50 degrees relative to the end plates. It is believed that this orientation of the flanges more closely follows the direction of the tensile force exerted on them as the side plates are stressed and bowed outwardly when the ducted cable or hose is routed around curves and bends. Twisting and tearing forces at the bases of the flanges are thereby reduced compared with prior art links.

Where the joints are connected in the four corners the flange is preferably tapered and directional. This allows for more stress and pressure when pulled towards the shearer. Each link fits together and then is pulled in a forward motion called "line pull". The line pull through friction from inside and outside concertinas each link tighter together because the dovetail joint at the front widens slightly. The dovetail flange joints taper east west as well as north south. They cannot be inserted backwards. The taper not only tapers larger in the rear but also tapers smaller to the front section. This relates to a jigsaw puzzle effect whereby the top and bottom sections, left and right should be an interference fit.

The sides of the flanges diverge outwardly from a narrow neck portion 12 to form a dovetail-like profile 13 which engages the correspondingly shaped slots 11 of the end plates. The radiuses of curvature 14 at the bases of the flanges are relatively large compared with prior art chain links to minimise stress concentrations at these points. The asymmetrical profile of the flanges directs any fatigue cracks occurring at the base toward the side plate rather than directly across the width of the flange to cause failure.

Figure 6:
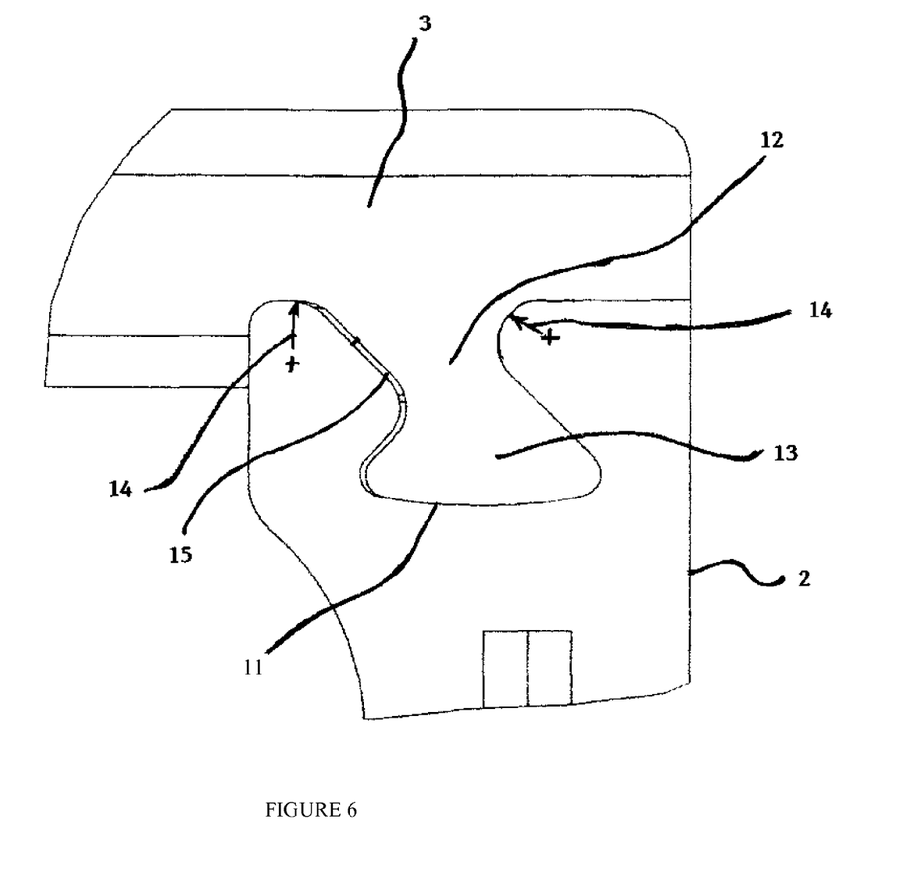
FIG. 6 is a detailed view of part of the link shown in FIG. 4.

The slots in the end plates are tapered so as to prestress and deform the flanges inwardly. This together with a clearance 15 formed along the inside edges of the flanges as shown in FIG. 6, an expanded partial view of A in FIG. 4, further reduces twisting and tearing stresses on the bases of the flanges. Preferably but not essentially this clearance may be of the order of 0.425 mm.

Figure 3:
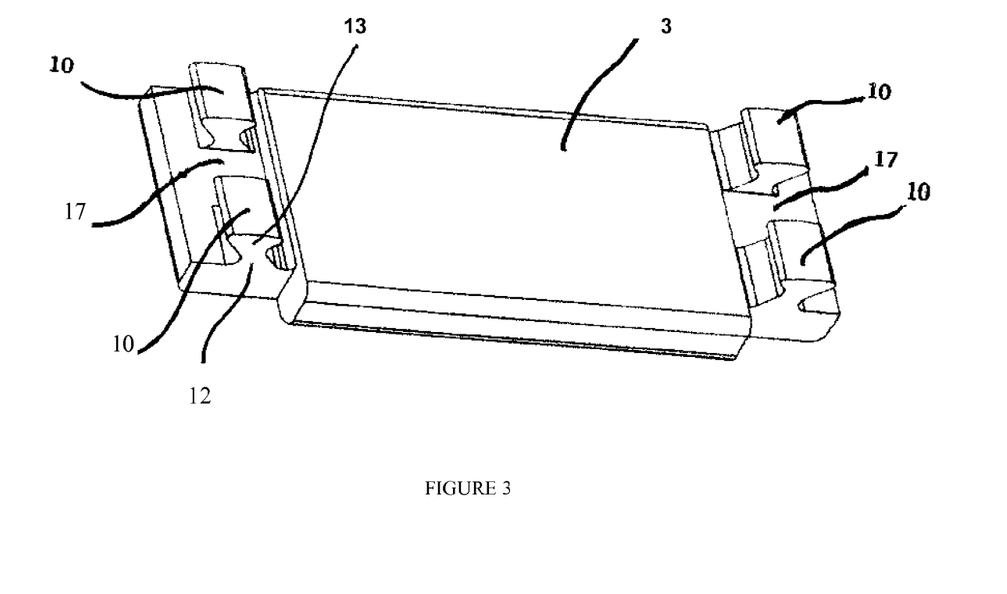
FIG. 3 is a perspective view of a side wall of the link of FIG. 1.
Figure 4:
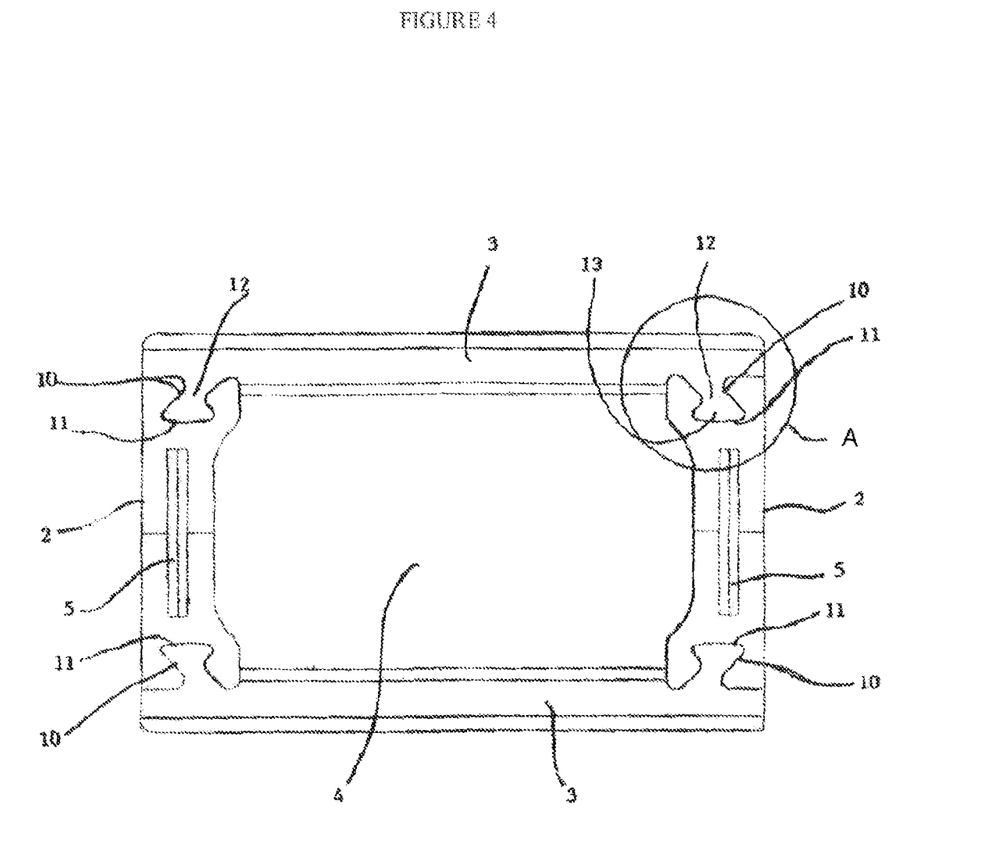
FIG. 4 is an elevation view of the link of FIG. 1 from direction A.
Figure 5:
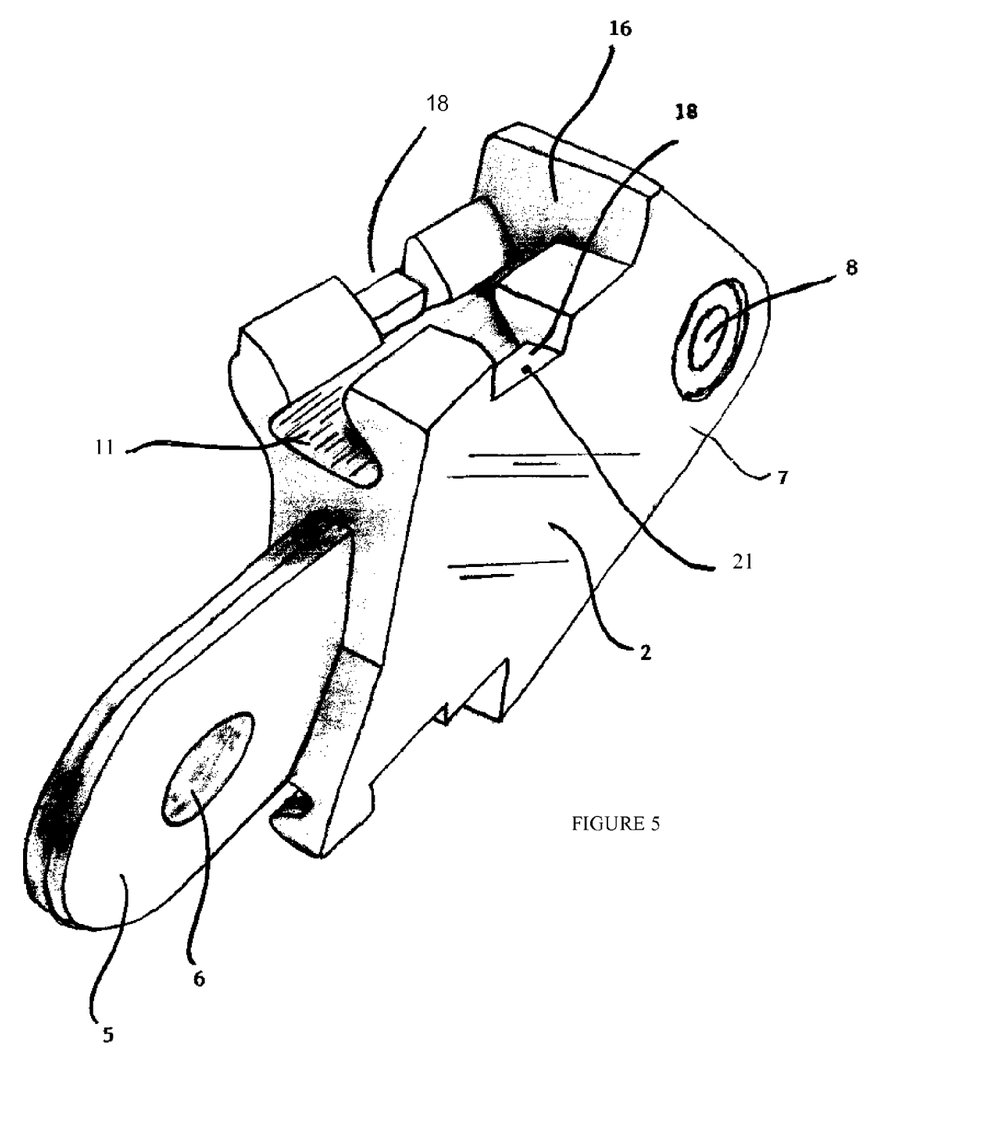
FIG. 5 is a perspective view of an end wall of the link of FIG. 1.
Figure 7:
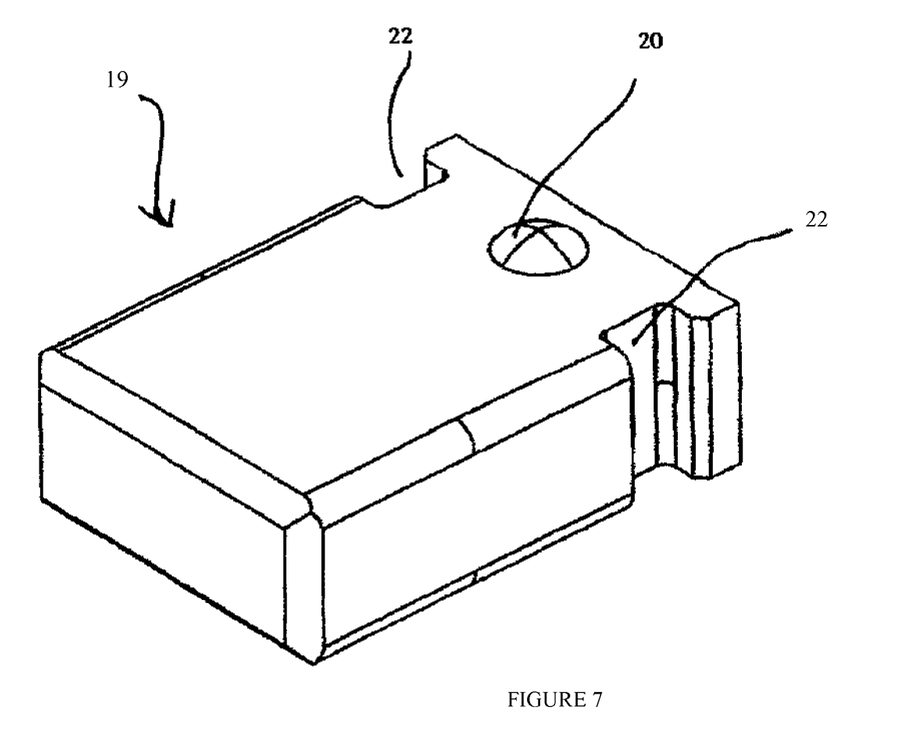
FIG. 7 is a perspective view of a key for locking the connection between the side and end walls.

In use the side walls 3 are releasibly connected to the end plates 2 at each corner by sliding the flanges 10 into the slots 11 to abut the back walls 16. As best shown in FIGS. 3 and 5 each set of flanges 10 is formed with a cutout 17 which aligns with a gap 18 in its associated slot 11 when the side and end plates are assembled. A locking key 19 as shown in FIG. 7 is then inserted transversely through the aligned cutout and gap to prevent accidental separation of the plates. Preferably the key is rectangular in cross-section and is sized for a close tolerance push fit into the cutout and gap. It may also be formed with a projection 20 adjacent its outer end which seats in a depression 21 in the cutout (see FIG. 5) to prevent inadvertent removal. Crevices 22 may also be formed adjacent the outer end to assist in prising the key out of the cutout during removal of the side wall.

Referring again to FIG. 2, when used in a longwall mining operation, the chain of links is used in the orientation shown in FIG. 1. That is, with walls 3 facing upwards. In the event of a rockfall, debris may fall onto the cable carrying chain. However, should the need arise to access the cables or hoses inside the chain, such as to address a leak or the like, then the locking keys 19 will still be accessible because they are inserted from the side of the link. The locking keys 19 can be removed to permit disassembly of one or more links of the chain.

Figure 8:
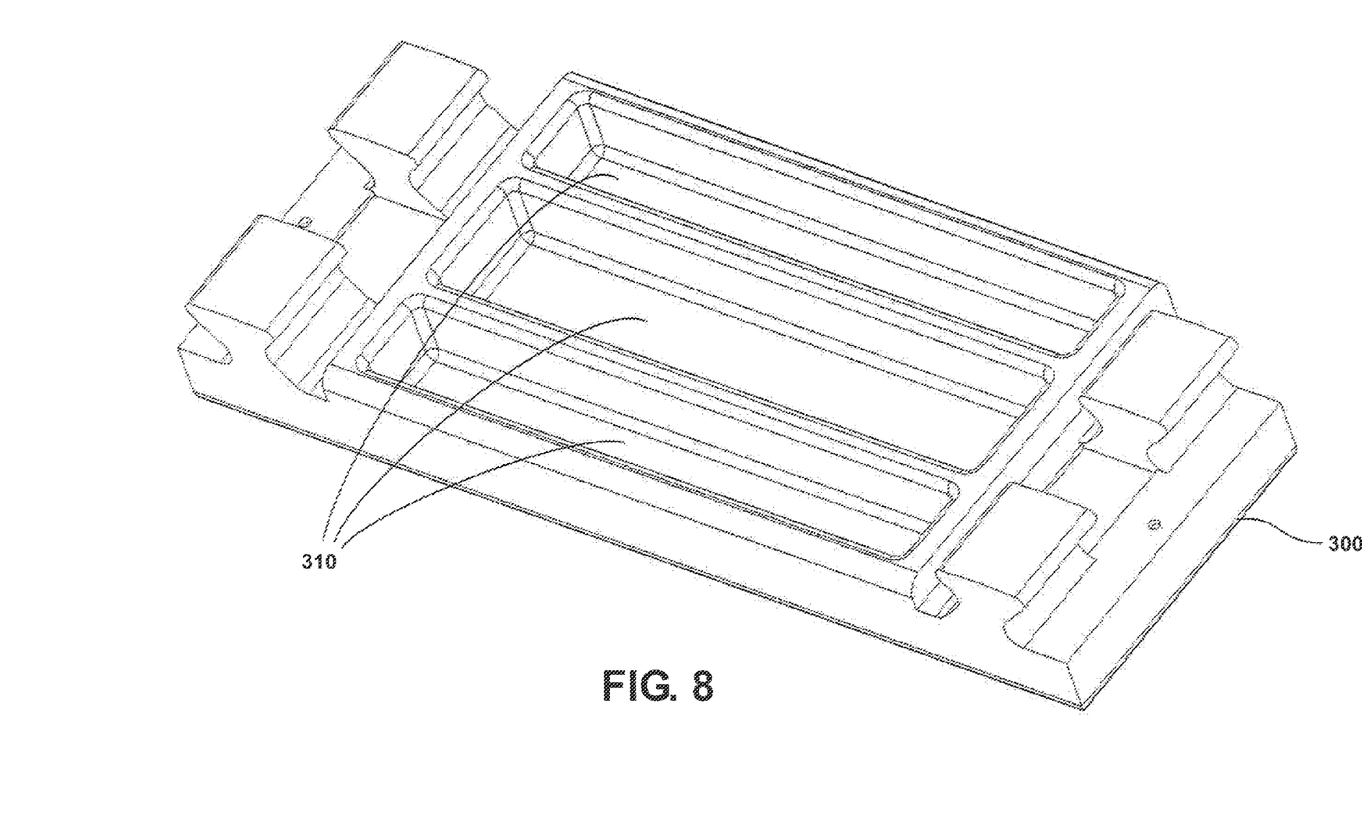
FIG. 8 is a perspective view of an alternative version of a side wall component.

Referring to FIG. 8, a modified version of a side wall component 300 is shown. This version differs from previously described side wall 3 in that recesses 310 are formed on the inside surface of the side wall. These recesses face inwardly when the side wall 300 is assembled to form a link in a cable carry chain. The recesses 310 save on material and weight in the assembly.

Figure 9:
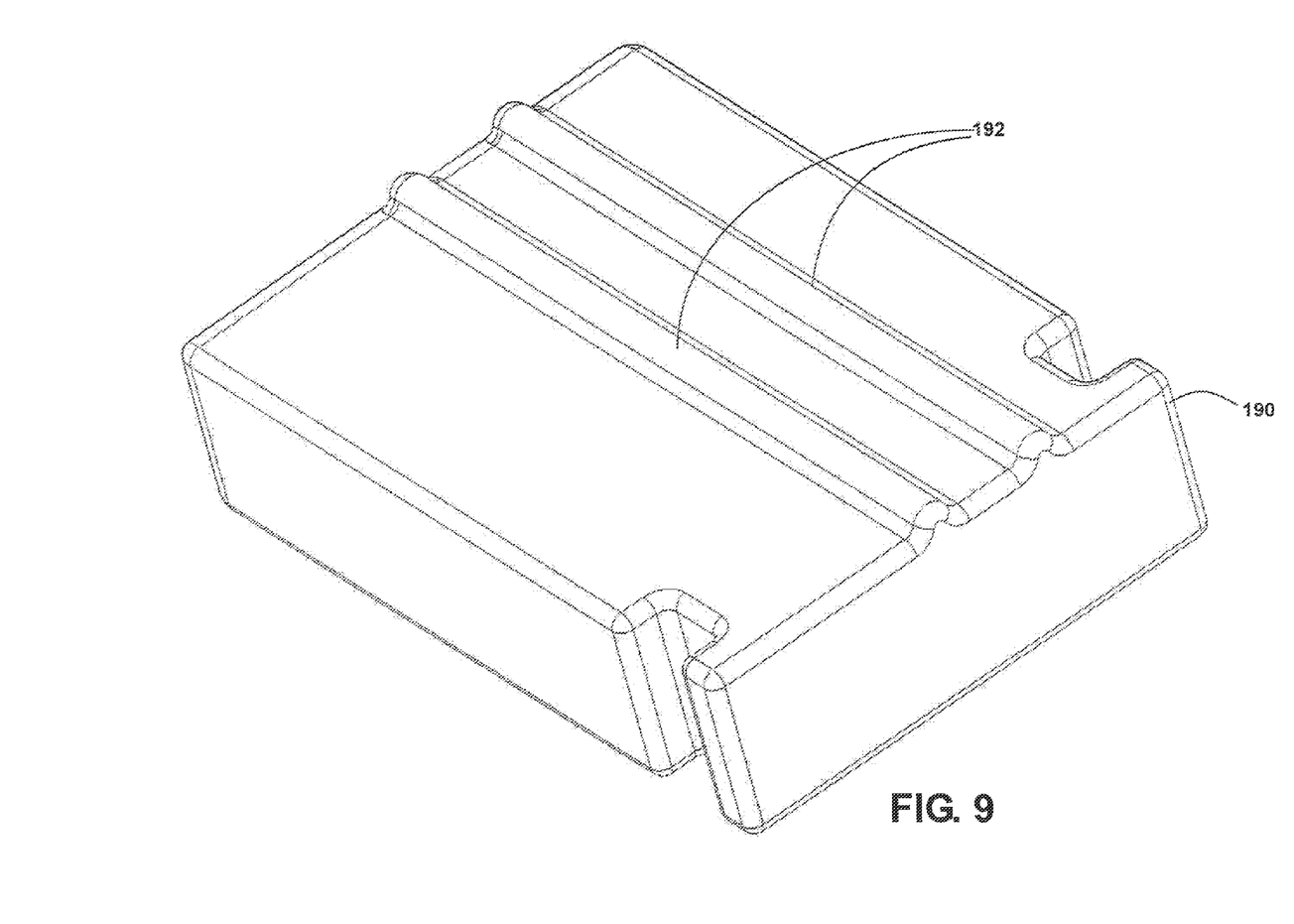
FIG. 9 is a perspective view of an alternative version of a locking key.

Referring to FIG. 9, a modified version of locking key 190 is shown. This version differs from the previously described key 19 in that a pair of longitudinal ridges 192 are provided on one face of the key 190. These ridges correspond with a pair of grooves provided in either the side wall 3 or end wall 2 to ensure that the locking key 190 can only be inserted into the chain link in one orientation. This ensures that the key 190 is assembled with crevices 22 facing outwardly which enable the key 190 to be later removed from the assembly.

It will thus be appreciated that this invention at least in the form of the embodiment disclosed provides a novel and improved link for constructing linear support chains. Clearly however the example described is only one currently preferred form of the invention and a wide variety of modifications may be made which would be apparent to a person skilled in the art. For example the shape and size of the link as well as the configuration of the flanges and slots may all be changed following further development work by the inventor. Also, while it is currently preferred to mould the link from Nylon 66 the invention extends to the use of any other suitable material.

Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A link for a linear carrier chain comprising:
   side walls;
   end walls connected to the side walls to form a duct; and
   flanges disposed at adjacent edges of some of said walls,
      said flanges being slidably engaged in slots in others of said walls to connect the side walls and end walls,
   wherein said flanges are disposed at outwardly directed oblique angles relative to the surface of said walls on which said flanges are disposed to reduce stress concentrations at a base thereof,
   wherein said flanges and slots are dimensioned to provide a clearance gap along inner sides of said flanges to reduce stress concentrations at the bases thereof.

2. The link as claimed in claim 1 wherein said link includes two side walls and two end walls with said flanges being formed on the side walls and the slots being formed in the end walls.

3. The link as claimed in claim 1 wherein said flanges include enlarged ends which slidably seat within correspondingly shaped cavities in the slots.

4. The link as claimed in claim 1 wherein said flanges are orientated to substantially correspond in direction with applied tensile forces on said flange arising during use of said chain for cable or hose routing.

5. The link as claimed in claim 1 wherein at least one of said slots is tapered inwardly along a length thereof whereby the flanges are prestressed to at least partially counteract said applied tensile forces.

6. A link for a linear carrier chain comprising:
   side walls;
   end walls connected to the side walls to form a duct; and
      flanges disposed at adjacent edges of some of said walls,
      said flanges being slidably engaged in slots in others of said walls to connect the side walls and end walls, wherein said flanges are disposed at outwardly directed oblique angles relative to the surface of said walls on which said flanges are disposed to reduce stress concentrations at a base thereof, wherein the flanges are formed with a dovetail shaped profile.

7. The link as claimed in claim 6 wherein said link includes two side walls and two end walls with said flanges being formed on the side walls and the slots being formed in the end walls.

8. The link as claimed in claim 6 wherein said flanges include enlarged ends which slidably seat within correspondingly shaped cavities in the slots.

9. The link as claimed in claim 6 wherein said flanges are orientated to substantially correspond in direction with applied tensile forces on said flange arising during use of said chain for cable or hose routing.

10. The link as claimed in claim 6 wherein at least one of said slots is tapered inwardly along a length thereof whereby the flanges are prestressed to at least partially counteract said applied tensile forces.

11. A link for a linear carrier chain comprising:
side walls;
end walls connected to the side walls to form a duct; and
flanges disposed at adjacent edges of some of said walls, said flanges being slidably engaged in slots in others of said walls to connect the side walls and end walls,
wherein said flanges are disposed at outwardly directed oblique angles relative to the surface of said walls on which said flanges are disposed to reduce stress concentrations at a base thereof,
wherein the ends of said flanges are noncircular in cross-section.

12. The link as claimed in claim 11 wherein said link includes two side walls and two end walls with said flanges being formed on the side walls and the slots being formed in the end walls.

13. The link as claimed in claim 11 wherein said flanges include enlarged ends which slidably seat within correspondingly shaped cavities in the slots.

14. The link as claimed in claim 11 wherein said flanges are orientated to substantially correspond in direction with applied tensile forces on said flange arising during use of said chain for cable or hose routing.

15. The link as claimed in claim 11 wherein at least one of said slots is tapered inwardly along a length thereof whereby the flanges are prestressed to at least partially counteract said applied tensile forces.

16. A link for a linear carrier chain comprising:
side walls;
end walls connected to the side walls to form a duct; and
flanges disposed at adjacent edges of some of said walls, said flanges being slidably engaged in slots in others of said walls to connect the side walls and end walls,
wherein said flanges are disposed at outwardly directed oblique angles relative to the surface of said walls on which said flanges are disposed to reduce stress concentrations at a base thereof,
wherein the flanges have an asymmetrical profile whereby any fatigue cracks occurring at the bases of said flanges are directed into the side walls rather than across the width of said flanges.

17. The link as claimed in claim 16 wherein said link includes two side walls and two end walls with said flanges being formed on the side walls and the slots being formed in the end walls.

18. The link as claimed in claim 16 wherein said flanges include enlarged ends which slidably seat within correspondingly shaped cavities in the slots.

19. The link as claimed in claim 16 wherein said flanges are orientated to substantially correspond in direction with applied tensile forces on said flange arising during use of said chain for cable or hose routing.

20. The link as claimed in claim 16 wherein at least one of said slots is tapered inwardly along a length thereof whereby the flanges are prestressed to at least partially counteract said applied tensile forces.

21. A link for a linear carrier chain comprising:
side walls;
end walls connected to the side walls to form a duct;
flanges disposed at adjacent edges of some of said walls, said flanges being slidably engaged in slots in others of said walls to connect the side walls and end walls, and
a number of locking keys which resist the flanges from sliding out of engagement with their respective slots,
wherein said flanges are disposed at outwardly directed oblique angles relative to the surface of said walls on which said flanges are disposed to reduce stress concentrations at a base thereof.

22. The link as claimed in claim 21 wherein said keys are rectangular and are formed with projections adjacent their outer ends which seat in depressions in the
cutouts to prevent inadvertent removal.

23. The link as claimed in claim 21 wherein the keys include ridges which correspond with grooves in the walls to ensure that the keys can be inserted into the link in only one orientation.

24. The link as claimed in claim 21 wherein, in use, the locking keys are accessible for removal from a side of the link.

25. The link as claimed in claim 21 wherein said link includes two side walls and two end walls with said flanges being formed on the side walls and the slots being formed in the end walls.

26. The link as claimed in claim 21 wherein said flanges include enlarged ends which slidably seat within correspondingly shaped cavities in the slots.

27. The link as claimed in claim 21 wherein said flanges are orientated to substantially correspond in direction with applied tensile forces on said flange arising during use of said chain for cable or hose routing.

28. The link as claimed in claim 21 wherein at least one of said slots is tapered inwardly along a length thereof whereby the flanges are prestressed to at least partially counteract said applied tensile forces.

\* \* \* \* \*